F. BORGOLTE.
DISINFECTING DEVICE FOR MAUSOLEUMS.
APPLICATION FILED DEC. 28, 1912.
1,093,823.
Patented Apr. 21, 1914.
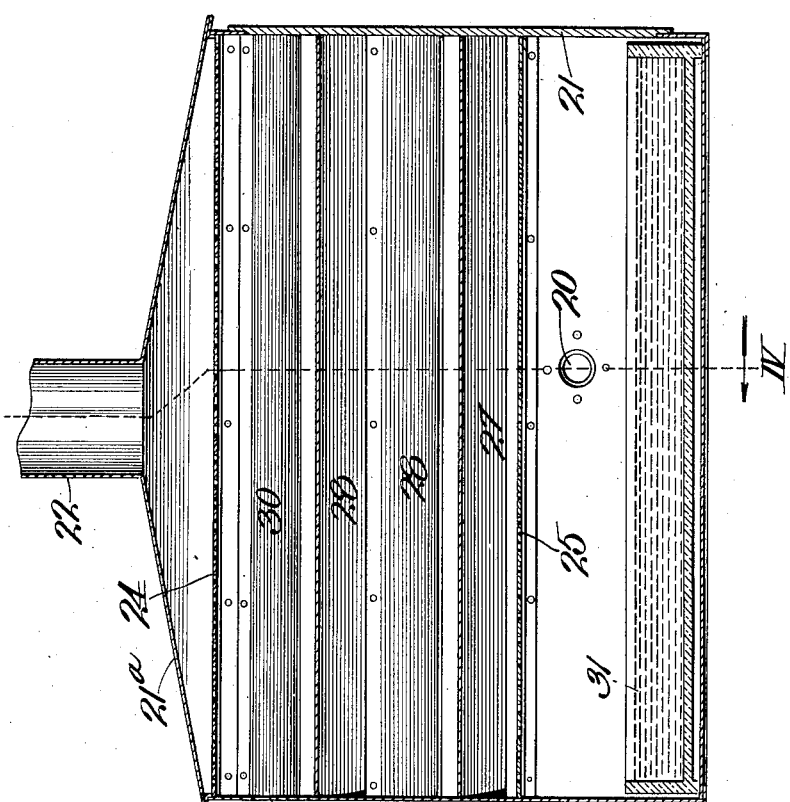
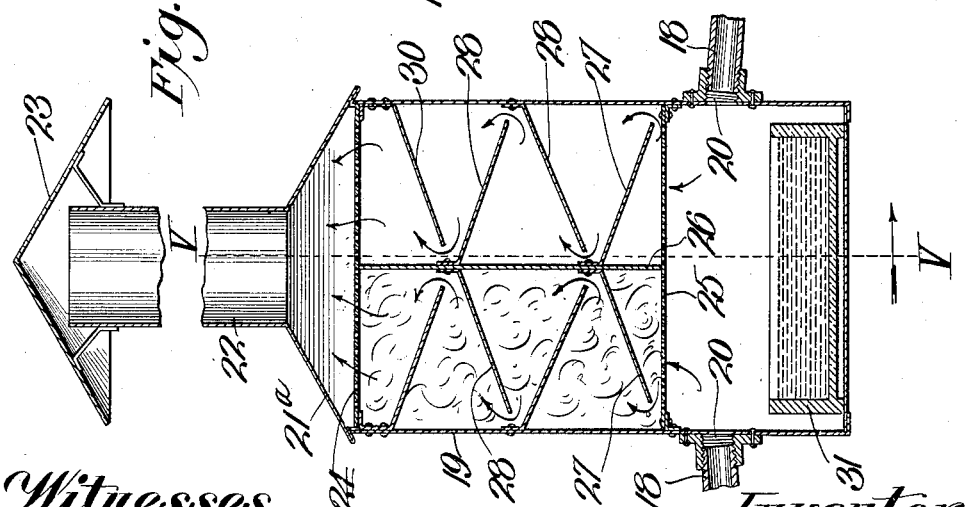

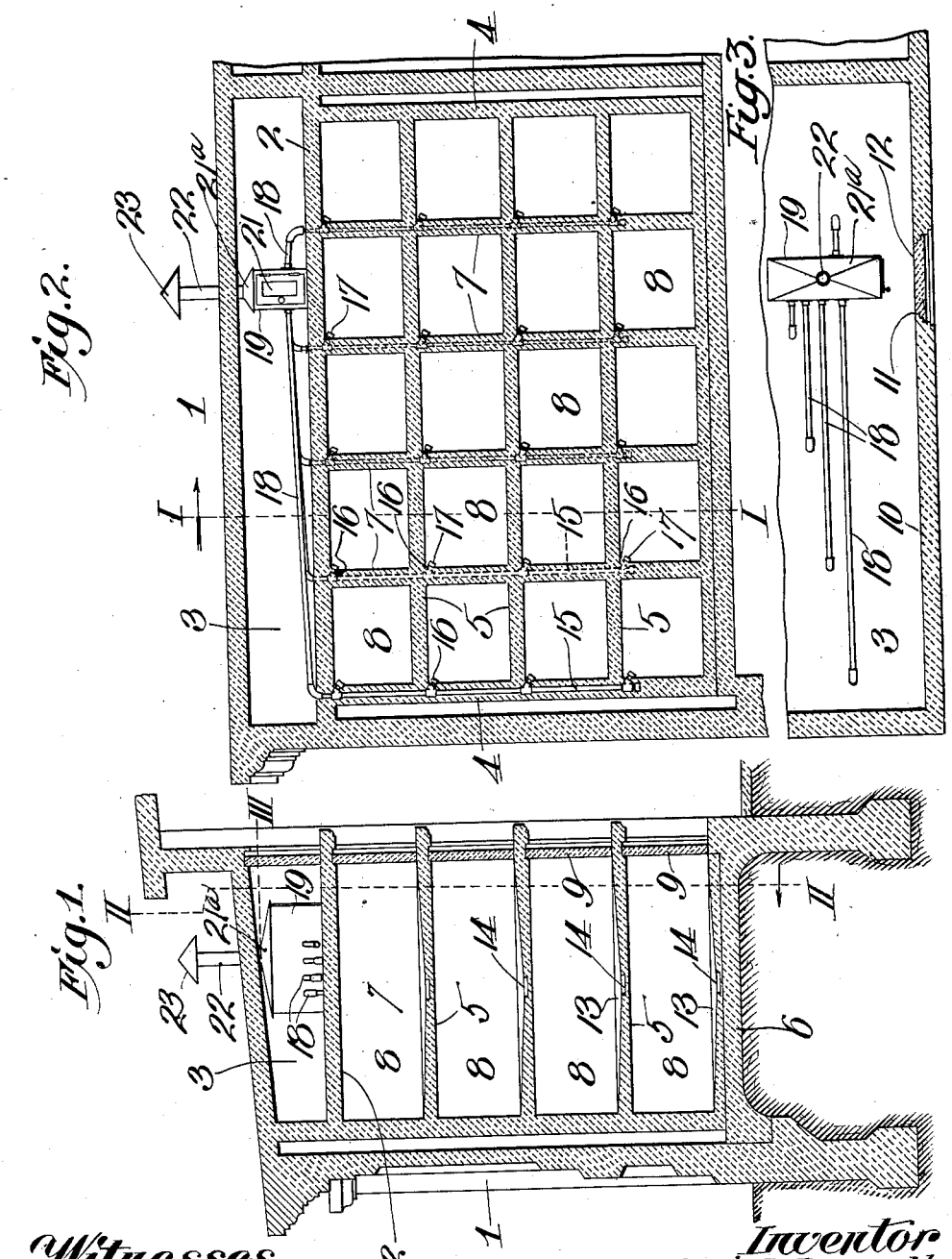

UNITED STATES PATENT OFFICE.

FREDERICK BORGOLTE, OF HUTCHINSON, KANSAS.

DISINFECTING DEVICE FOR MAUSOLEUMS.

1,093,823.  Specification of Letters Patent.  Patented Apr. 21, 1914.

Application filed December 28, 1912. Serial No. 739,029.

*To all whom it may concern:*

Be it known that I, FREDERICK BORGOLTE, a citizen of the United States, residing at Hutchinson, in the county of Reno and State of Kansas, have invented certain new and useful Improvements in Disinfecting Devices for Mausoleums, of which the following is a specification.

This invention relates to disinfecting devices for mausoleums of the type which have been termed "community" mausoleums, that is to say one having a large number of individual compartments or vaults, arranged in series and my object is to produce a deodorizing and disinfecting device common to each series of vaults or compartments.

A further object is to produce a deodorizing and disinfecting device which can be readily charged with deodorizing disinfectant when desirable.

With this general object in view and others as hereinafter appear, the invention consists in certain novel and peculiar features of construction and organization as hereinafter described and claimed; and in order that it may be fully understood reference is to be had to the acompanying drawings, in which—

Figure 1, is a transverse section of a part of a mausoleum embodying my invention, the section being on the line I—I of Fig. 2. Fig. 2, is a vertical section on the line II—II of Fig. 1. Fig. 3, is a horizontal section on the dotted line III of Fig. 1. Fig. 4, is an enlarged vertical section of the deodorizing and disinfecting device on the line IV—IV of Fig. 5. Fig. 5, is a section on the line V—V of Fig. 4.

Referring now to the drawings, in detail where like reference characters identify corresponding parts in all the figures, 1 indicates a mausoleum having near its roof a horizontal partition 2, to provide a chamber 3 above said partition, the chamber below the partition having ends 4 connected by a plurality of horizontal partitions 5, subdividing the space below partition 2, and formed integral with the floor 6 of the mausoleum and the partition 2 and partitions 5, are vertical partitions 7, the crossed partitions 5 and 7 dividing the chamber below partition 2 into a series of individuals vaults or compartments 8. The inner or corridor ends of these compartments or vaults 8 are closed by removable plates 9, in order that caskets may be placed in the vaults or compartments, after which said plates 9 are replaced in position and are sealed around the edges by cement, not shown, for the purpose of making the connection airtight, it being understood that the faces of these plates 9 are adapted to contain obituary inscriptions. The chamber 3 above the series of vaults or compartments has a front wall 10 provided with an opening 11 wherein a sealing plate 12 is adapted to be removably secured for a purpose which hereinafter appears.

The bottom of each compartment or vault is formed with a shallow depression or recess 13 in its upper side, the bottom of said recesses tapering to and communicating with a cavity 14 adapted to contain quicklime or other substance adapted to act destructively upon fluid seeping from a decomposing body in the vault.

For the purpose of carrying off the gases of decomposition from the vaults or compartments, I provide a vertical pipe 15 for each set of superimposed vaults or compartments 8, one of said pipes being arranged in the end wall 4 of the mausoleum and the others in partitions 7 and each pipe is provided with a short branch pipe 16, extending into the upper part of the adjacent vault, and said branch pipes are closed by removable caps 17, when their respective vaults or compartments are empty, these caps being removed when caskets are placed in the vaults so that the gases of decomposition may escape through the branch pipes and then pass up through the vertical pipes into the connecting pipes 18 which slope upwardly toward and communicate with a deodorizing and disinfecting receptacle 19 located in chamber 3, adjacent to the opening 11 so as to be conveniently accessible through the latter.

The disinfecting and deodorizing device is preferably in the form of a rectangular vessel having openings 20 in communication with pipes 18 and having an end door 21, by which access is had to the interior of the receptacle.

The receptacle 19 is provided with an upwardly tapering top 21$^a$ leading to a stack 22 which extends up through the roof of the mausoleum and is covered by a conical hood 23, the latter of course being to exclude rain, snow, hail, dust, etc., from the stack.

Adjacent to the top is a perforated partition 24 and a similar perforated partition 25 is disposed just above the plane of openings 20 and extending from partition 24 and partition 25 is a central partition 26 provided with two sets of downwardly diverging baffles 27 and 28. Between baffle plates 27 and 28 and above the baffles 28, baffles 30 extend downwardly and inwardly from the side wall and the space between the perforated plates 24 and 25 is filled with any suitable material, such as cotton susceptible of being saturated with a deodorizing agent, and of retaining the same for a considerable period of time and located in the receptacle below partition 25 is a vessel 31 adapted to contain formaldehyde or an equivalent substance which acts as a disinfectant of the air or gases which pass from the individual compartments or vaults through said pipes and into the receptacle, which air or gases as further deodorized and disinfected while passing up through the disinfecting and deodorizing substance between the baffle plates, this disinfecting and deodorizing action being made effectual by compelling the air and gases to follow a tortuous course in effecting escape from the receptacle, this tortuous course being indicated by the arrows in Fig. 4.

It will be apparent from the above that by removing door 12 and opening door 21, the vessel 31 can be recharged with formaldehyde or its equivalent whenever desired and that the opening of the door also gives access to any of the spaces between the partitions of the receptacle 19, so that the absorbent material can be renewed whenever it is found desirable or necessary.

From the above description it will be apparent that I have produced a disinfecting device embodying the features of advantage enumerated as desirable and I wish to be understood that I reserve the right to make all changes falling within the spirit and scope of the invention as defined in the appended claim.

I claim: —

A disinfecting and deodorizing device for mausoleums, comprising a receptacle having a discharge stack at its upper end, a horizontally perforated partition between said receptacle and stack, a vessel adapted to contain a disinfectant in the lower end of the receptacle, a horizontally perforated partition through the lower portion of the receptacle above said vessel, a series of pipes communicating with said lower portion below said partition, a vertical partition extending through the middle of the receptacle and connecting said horizontal partitions, a series of downwardly and outwardly extending baffle plates carried by said vertical partition at each side thereof, a series of downwardly and inwardly extending baffle plates carried by the sides of the receptacle and arranged in alternate relation with said first-named baffle plates thereby forming a zigzag passage between said horizontal partitions at each side of the vertical partition, and a mass of absorbent material arranged in each of said zigzag passages.

In testimony whereof I affix my signature in the presence of two witnesses.

FREDERICK BORGOLTE.

Witnesses:
G. C. PELLS,
C. M. BRANCH.

---

Copies of this patent may be obtained for five cents each, by addressing the "Commissioner of Patents, Washington, D. C."